(12) United States Patent
Yamamoto

(10) Patent No.: US 10,558,408 B2
(45) Date of Patent: Feb. 11, 2020

(54) IMAGE PROCESSING APPARATUS WHICH PERFORMS COMMUNICATION WITH EXTERNAL APPARATUS

(71) Applicant: Konica Minolta, Inc., Chiyoda-ku, Tokyo (JP)

(72) Inventor: Taro Yamamoto, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/886,151

(22) Filed: Feb. 1, 2018

(65) Prior Publication Data

US 2018/0217794 A1 Aug. 2, 2018

(30) Foreign Application Priority Data

Feb. 1, 2017 (JP) ................................. 2017-017044

(51) Int. Cl.
*G06F 3/12* (2006.01)
*H04N 1/00* (2006.01)
(Continued)

(52) U.S. Cl.
CPC ............ *G06F 3/1236* (2013.01); *G06F 3/122* (2013.01); *G06F 3/1222* (2013.01);
(Continued)

(58) Field of Classification Search
None
See application file for complete search history.

(56) References Cited

U.S. PATENT DOCUMENTS

| 6,542,254 | B1* | 4/2003 | Fujiki | ................. | H04L 12/5692 |
|  |  |  |  |  | 358/1.15 |
| 2002/0133564 | A1* | 9/2002 | Takayama | .......... | H04N 1/00408 |
|  |  |  |  |  | 709/217 |

(Continued)

FOREIGN PATENT DOCUMENTS

| CN | 102037763 A | 4/2011 |
| CN | 104094575 A | 10/2014 |
| JP | 09-024660 | 1/1997 |

OTHER PUBLICATIONS

First Office Action and Search Report dated May 20, 2019, by the Chinese Patent Office in corresponding Chinese Patent Application No. 201810081147.6, and an English Translation of the Office Action only. (23 pages).

*Primary Examiner* — Huo Long Chen
(74) *Attorney, Agent, or Firm* — Buchanan Ingersoll & Rooney PC

(57) ABSTRACT

The image processing apparatus performs a communication process targeting an external apparatus via a network. When performing a communication process, the image processing apparatus determines whether or not the external apparatus which is a target of the communication process is registered in a destination list in which apparatuses corresponding to a predetermined condition are registered. In accordance with the timeout period determined based on the determination result, the image processing apparatus determines that a timeout has occurred in the communication process. The image processing apparatus updates the destination list according to the determination result of the occurrence of the timeout and the determination result as to whether or not the external apparatus is registered in the destination list. Thereby, it is possible to provide an image processing apparatus capable of quickly executing communication process because the transmission/reception buffer is less likely to run out.

11 Claims, 11 Drawing Sheets

(51) Int. Cl.
*H04N 1/32* (2006.01)
*H04N 1/327* (2006.01)

(52) U.S. Cl.
CPC .......... *G06F 3/1238* (2013.01); *G06F 3/1261* (2013.01); *G06F 3/1286* (2013.01); *G06F 3/1288* (2013.01); *H04N 1/00244* (2013.01); *H04N 1/3209* (2013.01); *H04N 1/32096* (2013.01); *H04N 1/32507* (2013.01); *H04N 1/32523* (2013.01); *H04N 1/32765* (2013.01); *H04N 1/32791* (2013.01); *H04N 2201/0039* (2013.01); *H04N 2201/0094* (2013.01)

(56) References Cited

U.S. PATENT DOCUMENTS

| | | | |
|---|---|---|---|
| 2007/0174409 A1* | 7/2007 | Falck | H04W 48/14 709/208 |
| 2009/0237715 A1* | 9/2009 | Kasatani | H04L 63/0815 358/1.15 |
| 2011/0032815 A1* | 2/2011 | Kikuchi | H04W 48/20 370/221 |
| 2015/0124584 A1* | 5/2015 | Olrog | H04L 65/1016 370/218 |
| 2015/0173002 A1* | 6/2015 | Nakagawa | H04W 48/20 455/435.2 |
| 2018/0206169 A1* | 7/2018 | Liu | H04W 76/18 |

* cited by examiner

IMAGE PROCESSING APPARATUS WHICH PERFORMS COMMUNICATION WITH EXTERNAL APPARATUS

The entire disclosure of Japanese patent application No. 2017-17044 filed on Feb. 1, 2017, is incorporated herein by reference in its entirety.

BACKGROUND

Technological Field

The present invention relates to an image processing apparatus, an image forming apparatus, an image processing system, a control method of an image processing apparatus, and a control program of an image processing apparatus. More particularly, the present invention relates to an image processing apparatus, an image forming apparatus, an image processing system, a control method of an image processing apparatus, and a control program of an image processing apparatus capable of performing communication processes targeting an external apparatus via a network.

Description of the Related Art

Image forming apparatuses (MFPs (Multi Function Peripheral) having a scanner function, a facsimile function, a copying function, a function as a printer, a data communication function and a server function, facsimile machines, copying machines, printers, and so on) are image processing apparatuses. Some image processing apparatuses perform communication processes targeting an external apparatus via a network. For example, there are image forming apparatuses capable of forming (printing) images by so-called pull printing, and image processing apparatuses which read documents by a scanner function and transmits them to an external apparatus.

Specifically, according to such image processing apparatuses, request commands and response commands (messages) are exchanged with a communication target apparatus by using a communication protocol such as HTTP. Processing corresponding to the command is executed in each apparatus. A timeout period is set for the exchange of such communication. If there is no response from the communication destination within the timeout period for some reason, a communication error occurs (timeout occurs).

The timeout occurs, for example, in the following cases. That is, it is assumed that the communication process is performed with an external apparatus such as a server. When an error occurs in the external apparatus or the server itself goes down, even when a request command is transmitted from the image processing apparatus, a state occurs in which the external apparatus can not return a response. In such a case, when a request command is actually transmitted from the image processing apparatus to the external apparatus, the image processing apparatus keeps waiting for a response until a preset timeout period. For example, if the timeout period is set to 30 seconds, the image processing apparatus continues to wait for a response from the server for 30 seconds. If there is no response even after 30 seconds have elapsed, timeout of the communication process occurs.

A printing apparatus capable of bidirectional communication is disclosed in the following Document 1. In the case of transmission, a timeout is provided in a state waiting for buffer vacancy at the time of failure in securing the transmission/reception buffer. In this printing apparatus, when a timeout occurs, after that, it tries to write to the transmission buffer only once. If the writing fails, the process is cancelled. Resources such as CPUs are given to processes other than the communication process. The influence of performance deterioration can be reduced.

DOCUMENT(S)

Document(s) Related to Patent(s)

[Document 1] Japanese Unexamined Patent Publication No. (HEI) 09-024660

In the case of performing the communication process as described above, a buffer for transmission and reception is secured as a temporary storage area of data in the image processing apparatus. The transmission/reception buffer is released when the communication is completed.

FIG. 10 is a first diagram illustrating an example of a communication operation of a conventional image processing apparatus.

In FIG. 10, an example of a communication process performed between the image processing apparatus 801 and three servers 810 (server A 810a, server B 810b, and server C 810c) connected to the image processing apparatus 801 via a network is shown. When a request to perform a communication process (communication process 1) with the server A 810a as the target (destination) of the communication process is made, the system of the image processing apparatus 801 starts the communication process 1 (step S801). The system of the image processing apparatus 801 issues a communication instruction to the communication interface. Then, the communication interface secures transmission/reception buffers (that is, secures communication resources; step S802). The communication interface instructs communication to the communication unit. The communication unit transmits a request command to the server A 810a. Then, the server A 810a transmits a response to the image processing apparatus 801. Upon receiving the response at the communication unit, the image processing apparatus 801 receives the response at the system via the communication interface. As a result, the communication process is performed. Here, upon receiving the response, the communication interface releases the communication resource (step S803). As a result, communication resources that can be used in another communication process are secured.

Here, it is assumed that the server A 810a goes down and falls into a state in which it can not communicate with the image processing apparatus 801 (step S804). In such a case, when a request to perform the communication process (communication process 2) is made, the communication process 2 is started (step S805). Then, as in step S802, communication resources are secured (step S806), and a request is transmitted to the server A 810a. However, since the server A 810a is down at this time, the response is not transmitted to the image processing apparatus 801. Then, the image processing apparatus 801 waits until a predetermined timeout period (for example, 30 seconds) has elapsed since the request was transmitted (step S807). When the timeout period elapses, the image processing apparatus 801 determines that a timeout has occurred. At this time, the communication unit transmits a timeout notification to the communication interface. Then, the communication interface releases the reserved communication resources (step S808).

By the way, such communication resources for transmission and reception buffers are finite. When resources are insufficient at the time of the transmission processing, the reservation of the transmission/reception buffer fails, the communication process can not be executed, and the execution of the communication process is kept waiting until the resources are secured.

In case that the timeout occurs as described above, the communication resources (transmission/reception buffers) secured by starting the communication process are kept secured until timeout of the communication process occurs. Therefore, when communication processes with external apparatuses that can not respond occur continuously in the image processing apparatus, there is a problem that the free space in the transmission/reception buffer is temporarily run out and the communication processes can not be performed. That is, when the communication processes occur consecutively, the transmission/reception buffer is kept secured for 30 seconds in each of these communication processes until timeout occurs, for example. Then, it becomes impossible to newly secure transmission/reception buffer, and the execution of the later communication process to another external apparatus which can normally communicate is kept waiting (it is so-called semaphore wait).

FIG. 11 is a second diagram illustrating an example of a communication operation of the conventional image processing apparatus.

In FIG. 11, an example of a communication process performed between the image processing apparatus 801 and three servers 810 (server A 810a, server B 810b, and server C 810c) connected to the image processing apparatus 801 via a network is shown, as in FIG. 10. With respect to the above problem, a specific example will be explained with reference to FIG. 11.

When the server A 810a is down (step S850), requests to perform three communication processes (communication process 1, communication process 2, communication process 3) destined to the server A 810a respectively occur at the same time or in a short period of time. The system of the image processing apparatus 801 executes the communication processes in parallel (steps S851, S853, and S855). The communication interface secures communication resources for each communication process (steps S852, S854, and S856). For each communication process, a request is sent from the image processing apparatus 801 to the server A 810a. However, a response is not transmitted from the server A 810a. This state continues for about 30 seconds until timeout occurs.

Here, it is assumed that communication resources for the three communication processes are secured. There is no available communication resource (the transmission/reception buffer is run out). It becomes impossible to newly secure communication resources for a communication process. Then, even if a communication process 4 addressed to the server A 810a is newly requested before the timeout occurs (step S857), there is no available communication resource. As a result, securing communication resources fails (step S858). Therefore, with regard to the communication process 4 that failed to secure the communication resource, it is in a standby state until communication resources are available due to the occurrence of free communication resources. The communication process 4 takes time to be executed. This also applies to a case where the communication process 5 addressed to the normally operating server B 810b is newly requested until the timeout occurs (steps S859 and S860).

In the printing apparatus described in the Document 1, a timeout is provided after the transmission/reception buffer is run out, so as to improve the buffering. Then, the situation in which the transmission/reception buffer is run out can not be prevented in advance, as in the above case.

SUMMARY

The present invention has been made to solve such a problem. The object of the present invention is to provide an image processing apparatus, an image forming apparatus, an image processing system, a control method of the image processing apparatus, and a control program of the image processing apparatus capable of quickly executing a communication process and in which shortage of the transmission/reception buffer hardly occurs.

To achieve at least one of the abovementioned objects, according to an aspect of the present invention, an image processing apparatus reflecting one aspect of the present invention that performs communication process with an external apparatus via a network, comprises a hardware processor that: determine whether or not the external apparatus that is an object of the communication process is an apparatus registered in a destination list in which apparatuses corresponding to a predetermined condition are registered, by a first determination process, when performing the communication process; determine occurrence of a timeout in accordance with a timeout period decided based on the determination result of the first determination process, by a second determination process, in the communication process, and update the destination list according to the determination result of the second determination process and the determination result of the first determination process.

According to another aspect of this invention, an image forming apparatus comprising: the image processing apparatus according to the above, a hardware processor that acquires data stored in the external apparatus by performing communication process with the external apparatus, and an image forming unit for forming an image on a sheet based on the data acquired.

According to another aspect of this invention, an image processing system comprising: a plurality of image processing apparatuses connected to the network, according to the above, wherein the hardware processor in a first image processing apparatus out of the plurality of image processing apparatuses transmits information on the update, when the hardware processor updates the destination list of the first image processing apparatus, and the hardware processor in a second image processing apparatus out of the plurality of image processing apparatuses updates the destination list of the second image processing apparatus based on the information related to the update transmitted from the first image processing apparatus.

According to another aspect of this invention, an image processing system comprising: the image processing apparatus according to the above and a list providing apparatus, which are connected to the network, wherein the list providing apparatus includes a storage unit that stores the destination list, and the hardware processor updates the destination list by transmitting information to the list providing apparatus according to the determination result of the second determining process.

According to another aspect of this invention, a method for controlling an image processing apparatus that performs communication process with an external apparatus via a network, comprising steps of: determining whether or not the external apparatus that is an object of the communication process is an apparatus registered in a destination list in which apparatuses corresponding to a predetermined condition are registered, by a first determination process, when performing the communication process; determining occurrence of a timeout in accordance with a timeout period decided based on the determination result of the first determination process, by a second determination process, in the communication process, and updating the destination list according to the determination result of the second determination process and the determination result of the first determination process.

According to another aspect of this invention, a non-transitory computer-readable recording medium storing a controlling program for an image processing apparatus that performs communication process with an external apparatus via a network, the program causing a computer to execute the steps of: determining whether or not the external apparatus that is an object of the communication process is an apparatus registered in a destination list in which apparatuses corresponding to a predetermined condition are registered, by a first determination process, when performing the communication process; determining occurrence of a timeout in accordance with a timeout period decided based on the determination result of the first determination process, by a second determination process, in the communication process, and updating the destination list according to the determination result of the second determination process and the determination result of the first determination process.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings.

However, the scope of the invention is not limited to the disclosed embodiments. Hereinafter, an image processing system using the image processing apparatus according to the embodiment of the present invention will be described.

The image processing system has a server apparatus (hereinafter may be simply referred to as a server) and image forming apparatuses. The server and each of the plurality of image forming apparatuses are connected to each other so as to communicate with each other via a network. In addition to this, for example, a PC (Personal Computer) used by a user or the like may be connected to the network. In the image processing system, each of the image forming apparatuses can communicate with the server.

The image forming apparatus is an MFP (Multi Function Peripheral) having a scanner function, a copying function, a function as a printer, a facsimile function, a data communication function, and a server function. In the scanner function, an image of a set document is read and stored in a storage apparatus such as an HDD (Hard Disk Drive). In the copying function, the MFP further prints (prints) it on paper or the like. In the function as a printer, when a print instruction is received from an external terminal such as a PC, printing is performed on a sheet based on the instruction. In the facsimile function, facsimile data is received from an external facsimile machine or the like and stored in an HDD or the like. In the data communication function, data is exchanged with the connected external apparatus. In the server function, data stored in an HDD etc. can be shared by multiple users. The image forming apparatus functions as an image processing apparatus that executes processing of an image read by a scanner function or an image to be formed on a sheet by a print function.

Embodiments

Figure 1:
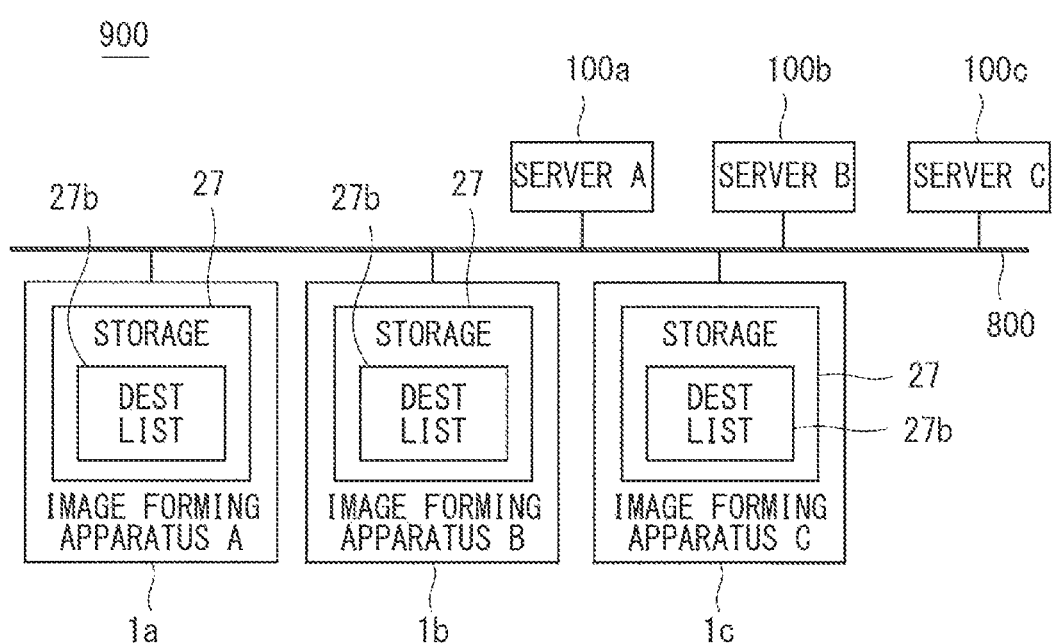
FIG. 1 is a diagram showing a configuration of an image processing system according to one embodiment of the present invention.

FIG. 1 is a diagram showing a configuration of an image processing system according to one embodiment of the present invention.

Referring to the figure, the image processing system 900 includes three image forming apparatuses 1a, 1b, 1c (the examples of image processing apparatus; image forming apparatus A, image forming apparatus B, and image forming apparatus C) and three servers (server A, server B, and server C) 100a, 100b, 100c. In the following description, each of the three image forming apparatuses 1a, 1b, and 1c is sometimes referred to as the image forming apparatus 1 without distinguishing them. In addition, there are cases where the three servers 100a, 100b, and 100c are not distinguished and each of them is referred to as a server 100.

Three image forming apparatuses 1 and three servers 100 are connected to the network 800, respectively. The network 800 is, for example, a LAN (Local Area Network). Three image forming apparatuses 1 and three servers 100 can communicate with each other via a network 800. Each apparatus may be connected to the network 800 via a LAN cable or the like, or may be connected to the network 800 by a so-called wireless LAN.

[Configuration of Image Forming Apparatus 1]

Figure 2:
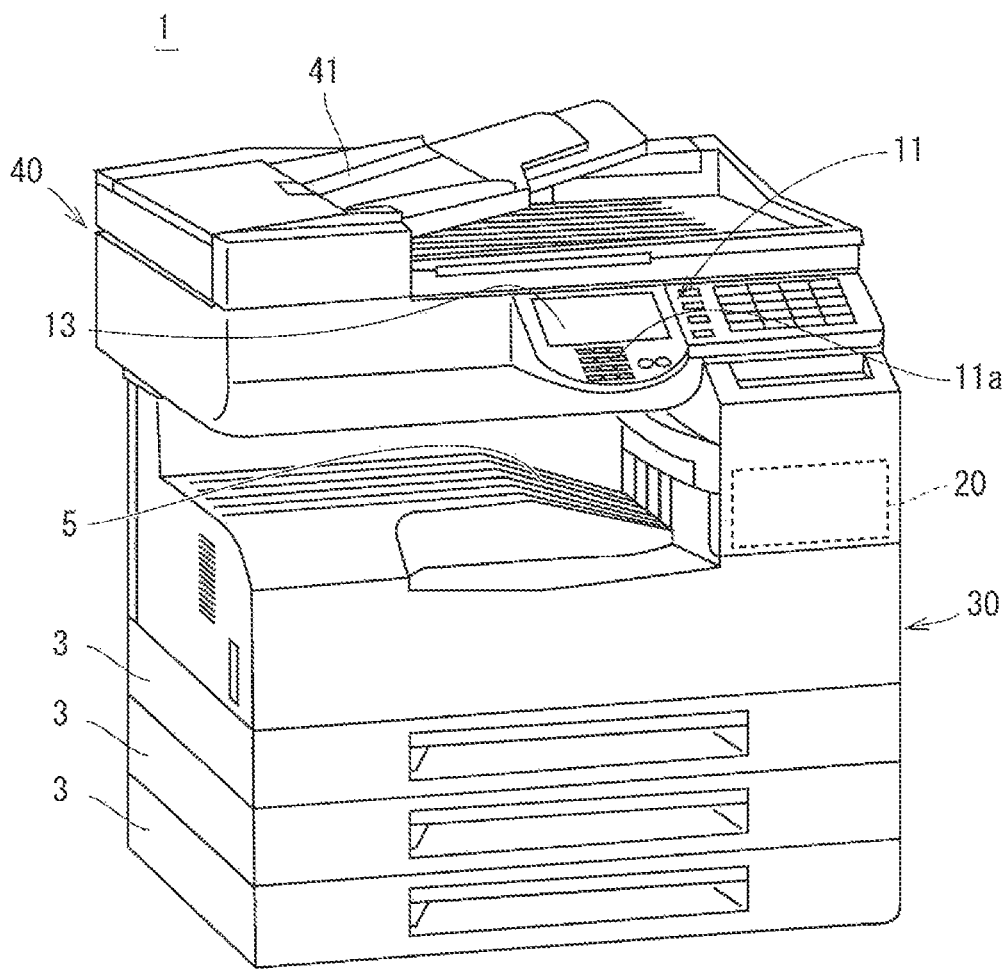
FIG. 2 is a perspective view showing an image forming apparatus.

FIG. 2 is a perspective view showing an image forming apparatus 1.

Referring to the figure, the image forming apparatus 1 includes paper feed cassettes 3, a paper discharge tray 5, an operation unit (an example of an operation accepting unit) 11, a control unit 20, a printing unit 30, and a scanning unit 40. As will be described later, the control unit 20 has a CPU 21 (shown in FIG. 3) and the like, and controls the operation of the image forming apparatus 1. The control unit 20 and the printing unit 30 are disposed inside the casing of the image forming apparatus 1.

The discharge tray 5 is disposed below a portion where the scanning unit 40 is disposed and above a portion where the print unit 30 is stored in the housing of the image forming apparatus 1. On the discharge tray 5, the sheet on which the image is formed by the printing unit 30 is discharged from the inside of the housing.

The operation unit 11 is arranged on the upper front side (the front side in the drawing) of the image forming apparatus 1. A plurality of operation buttons 11a that can be pressed by a user are arranged in the operation unit 11. A display panel 13 for displaying information to a user is arranged on the operation unit 11. The display panel 13 is, for example, an LCD (Liquid Crystal Display) having a touch panel. The display panel 13 displays guidance screens to the user, and displays operation buttons, and accepts touch operations from the user. The display panel 13 is controlled by the CPU 21 to perform display. The operation unit 11 receives an operation input from the user. When the operation buttons 11a and the display panel 13 are operated by the user, the operation unit 11 transmits an operation signal or a predetermined command corresponding to the operation to the CPU 21. That is, by operating the operation unit 11, the user can cause the image forming apparatus 1 to execute various operations.

The printing unit 30 roughly includes a toner image forming unit 300, a sheet conveying unit (not shown), and a fixing apparatus (not shown). The printing unit 30 forms an image on a sheet by electrophotography. The sheet conveying unit feeds paper from the paper feed cassettes 3 and transports it inside the casing of the image forming apparatus 1. A fixing apparatus conveys a sheet on which a toner image is formed by a heating roller and a pressure roller while sandwiching the sheet and heats and pressurizes the sheet to melt the toner attached to the sheet and fix the toner on the sheet.

The scanning unit 40 is disposed above the housing of the image forming apparatus 1. The scanning unit 40 has an ADF (Auto Document Feeder) 41. The scanning unit 40 executes the above-described scanner function. The scanning unit 40 scans a document placed on a transparent document table with a contact image sensor and reads the document as image data. The scanning unit 40 sequentially captures a plurality of documents set on the document tray by the ADF 41 and reads the documents with a contact image sensor to obtain image data.

Figure 3:
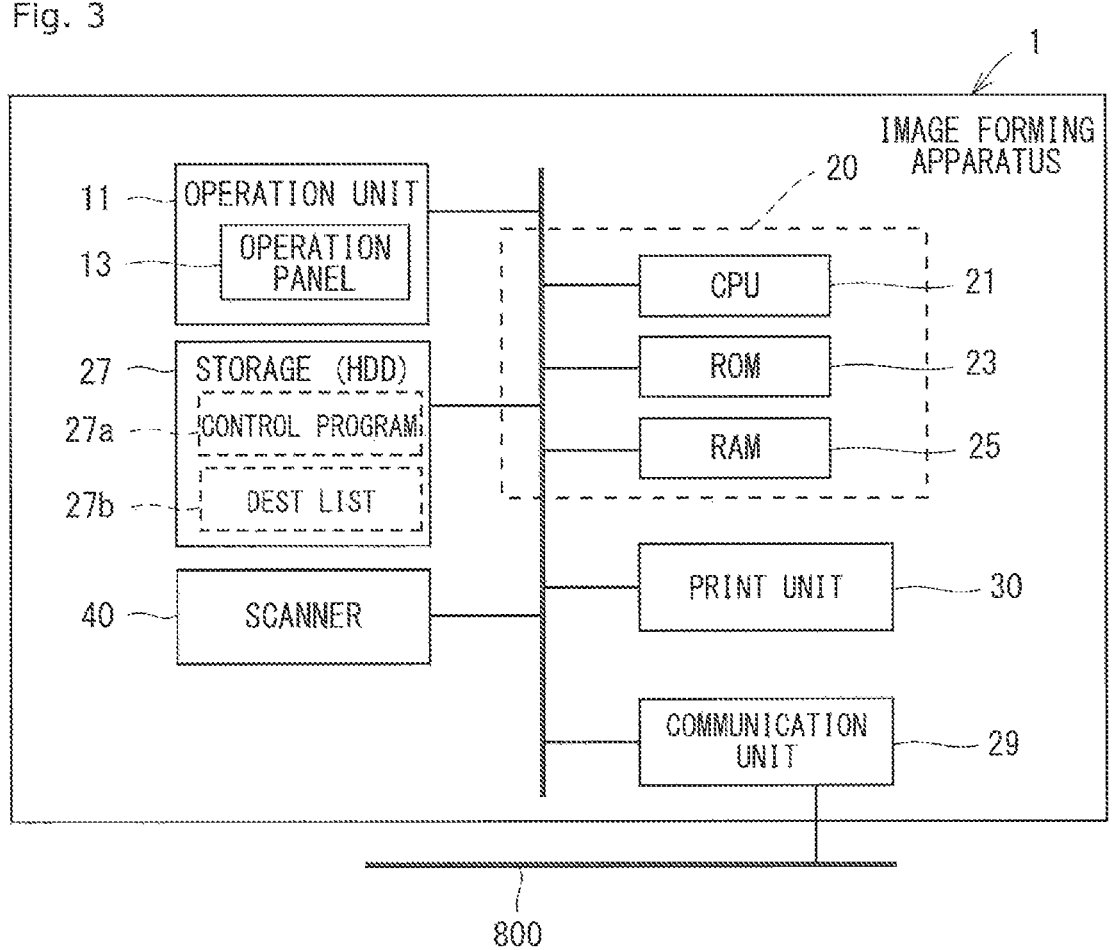
FIG. 3 is a block diagram showing a hardware configuration of an image forming apparatus.

FIG. 3 is a block diagram showing a hardware configuration of the image forming apparatus 1.

Referring to the figure, the image forming apparatus 1 includes a storage apparatus (an example of a storage unit) 27 and a communication unit 29 besides the above-described units.

The storage apparatus 27 stores data of print jobs sent from outside via the communication unit 29, image data read by the scanning unit 40, and the like. The storage apparatus 27 stores setting information of the image forming apparatus 1, a control program 27a for performing various operations of the image forming apparatus 1, a destination list 27b used in communication process with other apparatuses, and the like. The storage apparatus 27 can store a plurality of print jobs transmitted from one PC or a plurality of PCs or the like. The storage apparatus 27 is, for example, an HDD, a solid state drive, a nonvolatile memory, or the like, but is not limited thereto.

The communication unit 29 is configured by combining a hardware unit such as an NIC (Network Interface Card) or the like and a software unit that communicates using a predetermined communication protocol. The communication unit 29 connects the image forming apparatus 1 to the network 800. Thus, the image forming apparatus 1 can perform communication process for an external apparatus such as the server 100 or a PC connected to the network 800. Note that the communication unit 29 may be configured to be connectable to the network 800 by wireless communication.

By performing communication process, the image forming apparatus 1 can execute, for example, the following processing. For example, the image forming apparatus 1 can receive a print job from a PC, the server 100, or the like and perform printing. For example, the image forming apparatus 1 can transmit the image data read by the scanning unit 40 to the PC or the server 100, or can transmit the image data by e-mail via a mail server (not shown) or the like (Scan transmission function).

Further, for example, the image forming apparatus 1 can perform printing by a pull print function. The pull print is to acquire data stored in the server 100 or the like and perform printing, for example, as follows. That is, first, the user transmits job data to the server 100 or the like and stores it. Then, the user instructs the image forming apparatus 1 to print the job data of the server 100. The image forming apparatus 1 performs communication process with respect to the server 100, and acquires the job data and data based on the job data from the server 100. As a result, in the image forming apparatus 1, an image is formed on the paper based on the acquired data, and the image is output. In the image processing system 900 that performs such pull printing, an arbitrary image forming apparatus 1 can execute individual person's jobs and print them. The user goes to, for example, the front of the image forming apparatus 1 and causes the printed matter to be output in front of the user by executing pull printing. It is possible to prevent the printed matter from being seen by another person or going to other people, preventing leakage of information, and ensuring high security.

The control unit 20 includes a CPU 21, a ROM 23, and a RAM 25. The control unit 20 is connected to the system bus together with the operation unit 11, the printing unit 30, the scanning unit 40, and the like. As a result, the control unit 20 and the respective units of the image forming apparatus 1 are connected so as to be able to transmit and receive signals.

The CPU 21 controls various operations of the image forming apparatus 1 by executing a control program 27a or the like stored in the ROM 23, the RAM 25, the storage apparatus 27, or the like. When an operation signal is sent from the operation unit 11 or an operation command is transmitted from a PC or the like, the CPU 21 executes a predetermined control program 27a accordingly. As a result, the predetermined function of the image forming apparatus 1 is executed according to the operation of the operation unit 11 by the user and the like.

The ROM 23 is, for example, a flash ROM (Flash Memory). In the ROM 23, data used for performing the operation of the image forming apparatus 1 is stored. Like the storage apparatus 27, the ROM 23 may store various control programs, function setting data of the image forming apparatus 1, and the like. The CPU 21 reads data from the ROM 23 and writes data to the ROM 23. Note that the ROM 23 may be a non-rewritable one.

The RAM 25 is a main memory of the CPU 21. The RAM 25 is used to store data and the like necessary for the CPU 21 to execute the control program 27a.

The control unit 20 functions as a communication interface when performing communication process for an external apparatus by the communication unit 29. At this time, the control unit 20 reserves a predetermined area on the RAM 25 (secures communication resources) as a transmission/reception buffer for performing communication process. The communication resources are secured for each communication process, within a predetermined area prepared in advance for the RAM 25, and are held until communication process is completed. When the communication process is completed, the secured communication resources are released, and the area can be secured as a communication resource used in another communication process.

As described above, the scanner 40 executes the scanner function and reads the image data from the document. The image data read by the scanning unit 40 is converted into an application data format by the CPU 21 and stored in the storage apparatus 27 or the like. The CPU 21 can transmit the image data stored in the storage apparatus 27 or the like to the PC, the server 100, or the like.

[Configuration of Server 100]

Figure 4:
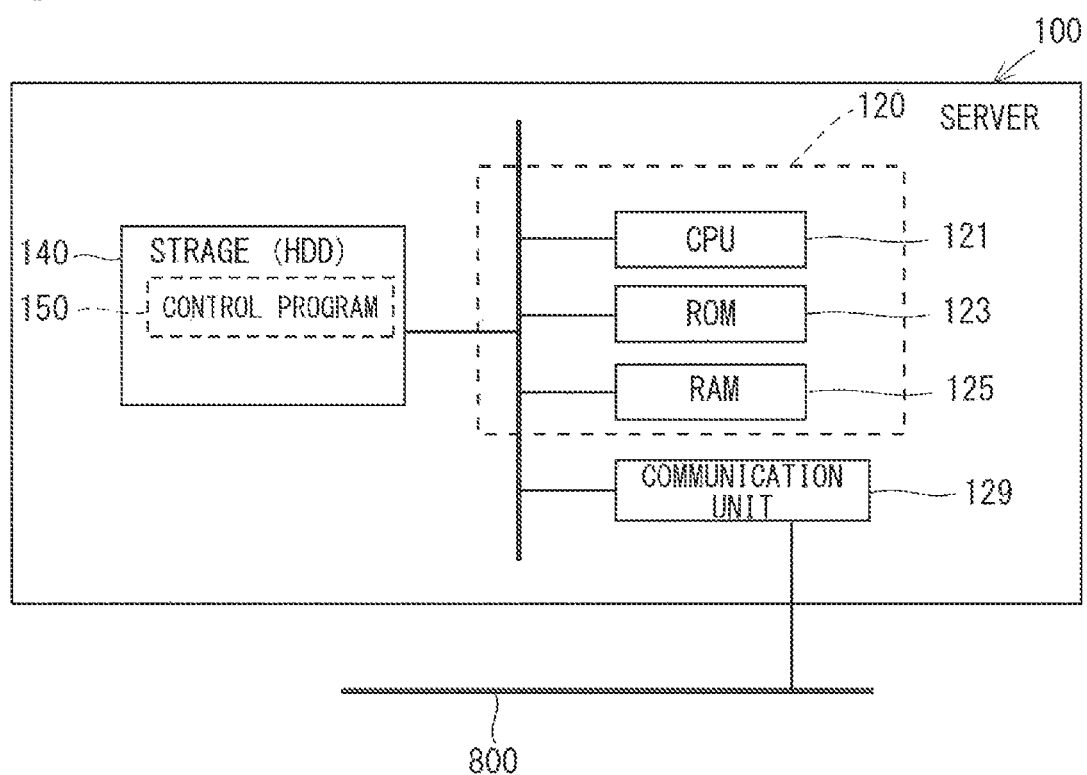
FIG. 4 is a block diagram showing a hardware configuration of a server.

FIG. 4 is a block diagram showing a hardware configuration of the server 100.

Referring to the figure, the server 100 includes a control unit 120, a communication unit 129, and a storage apparatus 140. The control unit 120 includes a CPU 121, a ROM 123, and a RAM 125. The control unit 120, the communication unit 129, and the storage apparatus 140 are connected to the system bus. As a result, the control unit 120, the communication unit 129, and the storage apparatus 140 are connected so as to be capable of transmitting and receiving signals. The storage apparatus 140 is, for example, an HDD, a solid state drive, a nonvolatile memory, or the like, but is not limited thereto.

The configuration of the communication unit 129 is substantially the same as the configuration of the communication unit 29 of the image forming apparatus 1, for example. The communication unit 129 connects the server 100 to the network 800. As a result, the server 100 can communicate with the image forming apparatus 1, the PC, and the like. The server 100 can receive, for example, image data read by the scanning unit 40 of the image forming apparatus 1 and data such as a print job transmitted from the PC. The received data is stored in the storage apparatus 140 as necessary.

The CPU 121 controls various operations of the server 100 by executing a control program 150 or the like stored in the ROM 123, the RAM 125, the storage apparatus 140, or the like. The CPU 121 executes the control program 150 according to an operation command transmitted from a PC or the like, information transmitted from the image forming apparatus 1, or the like. As a result, various functions of the server 100 are executed.

The ROM 123 and the RAM 125 operate in the same manner as the ROM 23 and the RAM 25 of the image forming apparatus 1, for example. The CPU 121 controls the operation of the server 100 by writing and reading data to and from the ROM 123 and the RAM 125.

[Description of Communication Process]

In the present embodiment, when the image forming apparatus 1 performs a communication process for an external apparatus such as the server 100 or the like, the control unit 20 refers to the destination list 27b stored in the storage apparatus 27. The destination list 27b is a database in which information on apparatuses corresponding to predetermined conditions is registered in a blacklist manner. In the destination list 27b, for example, information of an apparatus having a relatively high possibility of taking a long time to respond in the case where communication process is performed on that apparatus is registered. In the present embodiment, the destination list 27b is a blacklist type list in which apparatuses in which a timeout has occurred in a predetermined period are registered. Specifically, for example, information (an example of a predetermined condition) on an apparatus in which timeout has occurred when the communication process was started with the apparatus as the object of the communication process last time (an example of a predetermined period) has been registered. In the destination list 27b, for example, destination information capable of specifying an apparatus as a target of communication process when communicating by the network 800 is registered as information of the apparatus. The destination information is, for example, an IP address, but it is not limited thereto.

For example, an operation input from a user is made to the operation unit 11, or an instruction is transmitted from a PC or the like. As a result, the image forming apparatus 1 is required to perform communication process with an external apparatus. Then, the communication process is executed. The processing relating to the communication process in the image forming apparatus 1 is performed under the control of the control unit 20. The control unit 20 performs system control of the image forming apparatus 1 and executes communication process by causing the communication unit 29 to operate via a communication interface realized by the control unit 20 or the like.

Figure 5:
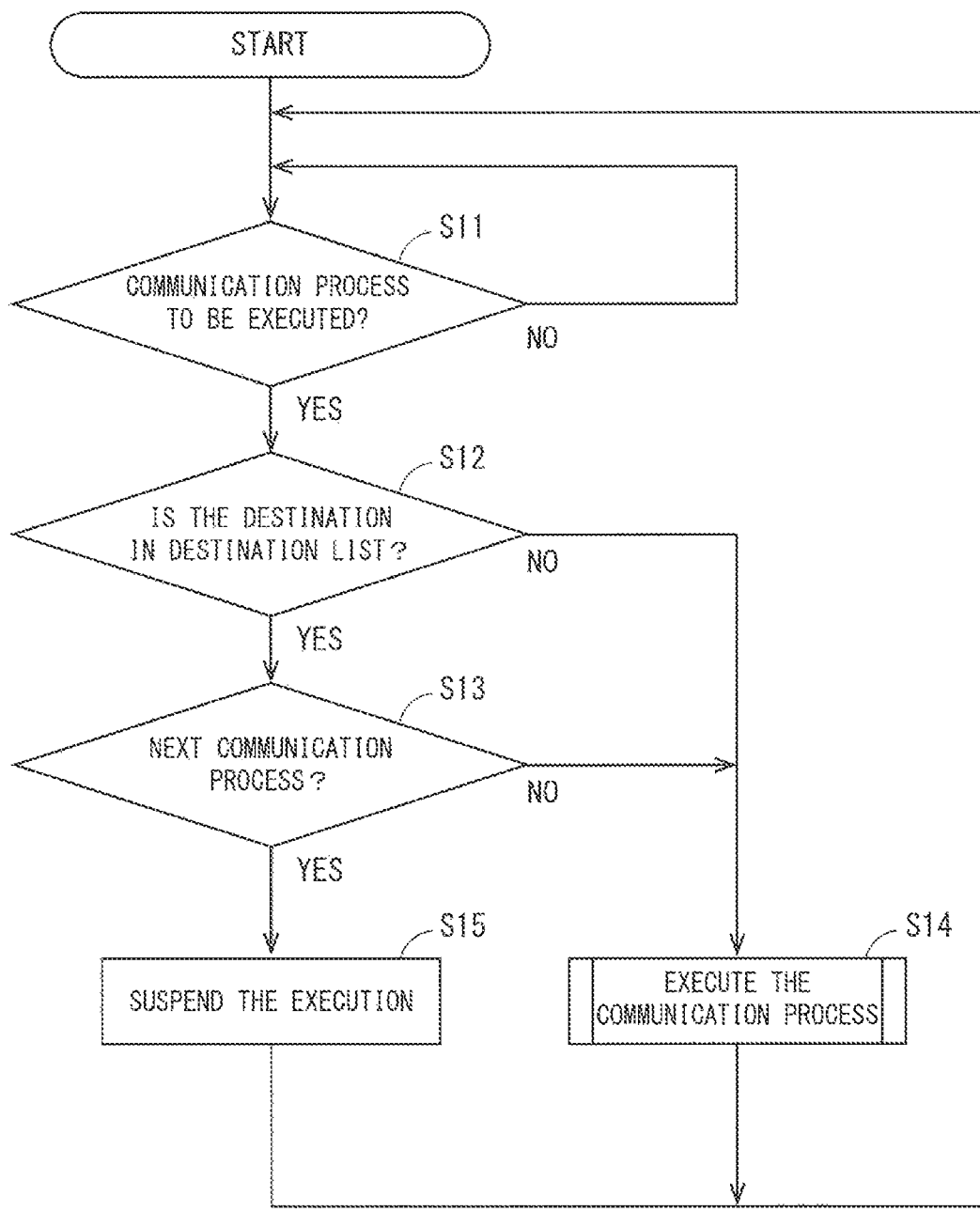
FIG. 5 is a flowchart showing an operation related to a communication process of the image forming apparatus.

FIG. 5 is a flowchart showing an operation related to a communication process of the image forming apparatus 1.

As shown in FIG. 5, in step S11, the control unit 20 confirms whether there is a communication process to be executed or not. If there is a communication process, the process proceeds to step S12. For example, when a communication process is newly requested or a communication process is suspended and is in the execution standby state as described later, it is determined that there is a communication process to be executed. The communication process to be executed is registered in the task queue.

In step S12, the control unit 20 determines whether or not the destination (target) to be communicated is in the destination list 27b as to the communication process to be executed. For example, the control unit 20 determines whether or not there is a IP address matching with a IP address of the destination, among the IP addresses registered in the destination list 27b. If the destination is in the destination list 27b, the process proceeds to step S13, and if not, the process proceeds to step S14. As a result, it is judged whether or not it is considered that there is a high possibility that a timeout will occur when executing the communication process.

In step S13, the control unit 20 determines whether there is a communication process (next communication process) to be executed next to the communication process to be executed. If there is no next communication process, the process proceeds to step S14. If there is a next communication process, the process proceeds to step S15.

In step S14, the control unit 20 actually executes the communication process as to the communication process to be executed, as described later. When the execution of the communication process is completed, the process returns to step S11.

On the other hand, in step S15, the control unit 20 suspends the execution of the communication process to be executed. As a result, the execution order of the communication process is lowered. Then, the process returns to step S11.

That is, in this case, in the process after returning to step S11, the communication process next to the communication process that suspended the execution is performed first. In other words, when determining that the external apparatus to be subjected to the communication process is an apparatus registered in the destination list 27b, the control unit 20 preferentially executes another communication process. In other words, the control unit 20 determines that the external apparatus to be subjected to the communication process is an apparatus registered in the destination list 27b. In that case, if there is another communication process scheduled to be executed after the communication process, the execution of the communication process is temporarily stopped (suspended) and execution of another communication process is started. Then, after starting execution of another communication process, the control unit 20 executes the temporarily stopped communication process.

Figure 6:
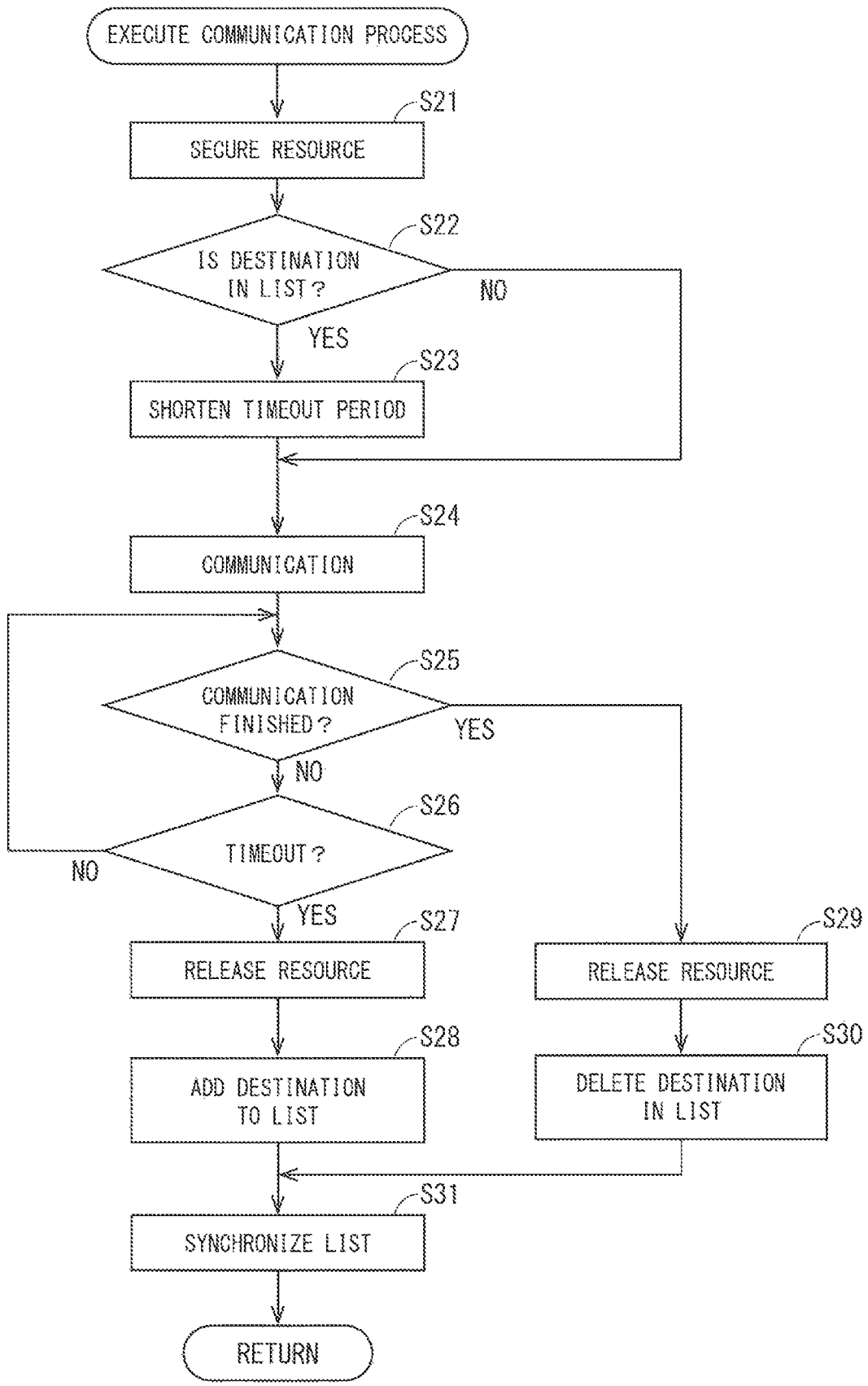
FIG. 6 is a flowchart showing an operation at the time of executing a communication process of the image forming apparatus.

FIG. 6 is a flowchart showing an operation at the time of executing a communication process of the image forming apparatus 1.

As shown in FIG. 6, in step S21, the control unit 20 secures communication resources to be used for this communication process. When communication resources can not be secured, the control unit 20 waits until communication resources can be secured.

In step S22, the control unit 20 determines whether or not the destination of the communication process is in the destination list 27b. The control unit 20 performs the determination in the same manner as the above-described step S12. If the destination is in the destination list 27b, the process proceeds to step S23. If the destination is not in the destination list 27b, the process proceeds to step S24.

In step S23, the control unit 20 sets a timeout period to be measured with respect to the communication process. At this time, the control unit 20 determines the timeout period to be shorter than the predetermined period. The timeout period is shortened by, for example, a predetermined shortening range. Upon setting such shortening of the timeout period, the process proceeds to step S24.

In step S24, the control unit 20 instructs the communication unit 29 to communicate via the communication interface. As a result, the request is transmitted from the image forming apparatus 1 to the external apparatus to be subjected to the communication process via the communication unit 29. When there is a response from the external apparatus, the control unit 20 communicates with the external apparatus in response to a request for communication process.

At this time, if it is determined in step S22 that the destination of the communication process is in the destination list 27b, the control unit 20 measures the time until the timeout with the timeout period shortened in step S23. On the other hand, if it is determined in step S22 that the destination is not in the destination list 27b, the control unit 20 measures the time until the timeout with the predetermined period not shortened as the timeout period. That is, when the control unit 20 determines that the external apparatus to be subjected to the communication process is not the apparatus registered in the destination list 27b, the control unit 20 determines the predetermined period as the timeout period.

In the present embodiment, the predetermined period as the reference time (default time) of the timeout period is, for example, 30 seconds. In the case of shortening the timeout period, the predetermined shortening range is, for example, 20 seconds. That is, the timeout period in the case of not shortening is, for example, 30 seconds. On the other hand, the timeout period when shortening setting is performed is, for example, 10 seconds. In normal communication, the time from when a request is transmitted to an external apparatus to when it receives a response is at most a few seconds.

In step S25, the control unit 20 determines whether or not the communication has ended. In response to a request for communication process, when the communication process is normally completed, it is determined that the communication has ended. If it has ended, the process proceeds to step S29. Otherwise, the process proceeds to step S26.

In step S26, the control unit 20 determines that a timeout has occurred in the communication process. The determination as to the occurrence of the timeout is made in accordance with the timeout period determined as described above. That is, when a timeout period has elapsed without receiving a response from an external apparatus after sending a request to the external apparatus to be subjected to the communication process, it is determined that a timeout has occurred. If it is determined that a timeout has occurred, the process proceeds to step S27. Otherwise, the process returns to step S25.

That is, when communication is performed, if communication is terminated without occurrence of timeout, the process proceeds to step S29, and if timeout occurs without finishing communication, the process proceeds to step S27.

If a timeout occurs without finishing the communication, the control unit 20 releases the communication resource secured for the communication process in step S27.

In step S28, the control unit 20 updates the destination list 27b according to whether or not a timeout has occurred and whether or not the destination of the external apparatus is registered in the destination list 27b. Specifically, when a timeout occurs and the destination of the communication process in which the timeout occurred is not in the destination list 27b, the control unit 20 adds the destination to the destination list 27b. That is, if the destination is not yet registered in the destination list 27b, and when a timeout occurs, the control unit 20 adds the IP address of the external apparatus that is the object of the communication process at that time to the destination list 27b. When the destination has already been registered in the destination list 27b, addition of the destination is not performed. Information such as the total number of times the timeout occurred and the time of day etc. may also be recorded in the destination list 27b.

On the other hand, if the communication is finished without occurrence of a timeout, the control unit 20 releases the communication resources secured for the communication process in step S29.

In step S30, the control unit 20 updates the destination list 27b depending on whether or not a timeout has occurred and whether or not the destination of the external apparatus is registered in the destination list 27b. Specifically, when the communication process is completed without occurrence of timeout, and the control unit 20 determines that the external apparatus which was subjected to the communication process is the apparatus registered in the destination list 27b, the control unit 20 deletes the destination of the external apparatus from the destination list 27b. It may be not necessary to delete the destination from the destination list 27b.

Upon completion of the processing of either step S28 or step S30, the processing of step S31 is performed. That is, the control unit 20 synchronizes the edited destination list 27b with other image forming apparatuses 1 connected to the network 800. In the present embodiment, as shown in FIG. 1, in each image forming apparatus 1, a destination list 27b referred to when performing communication process is stored. In step S31, when updating the destination list 27b, the control unit 20 transmits the information on the update to the other image forming apparatuses 1 via the network 800.

Information is transmitted from the image forming apparatus 1 in which the destination list 27b has been updated in this way to another image forming apparatus 1. Then, the other image forming apparatus 1 updates the destination list 27b stored in the other image forming apparatus 1 based on the transmitted information. As a result, when communicating with an external apparatus capable of communicating via the network 800, the other image forming apparatuses 1 can use the destination list 27b reflecting the result of the latest communication process which was performed.

In step S31, when the control unit 20 updates the destination list 27b, the control unit 20 may transmit the information of the updated destination list 27b and the like to another image forming apparatus 1. The other image forming apparatus 1 that has received the transmission may store the transmitted destination list 27b in the storage apparatus 27 instead of the old destination list.

[Example of Operation when Communication Process is Performed]

An example of an operation in a case where the image forming apparatus 1 performs a communication process with server 100 as an external apparatus to be subjected to communication process will be described. In the following description, the server A may be referred to as a server 100a, the server B may be referred to as a server 100b, and the server C may be referred to as a server 100c.

Figure 7:
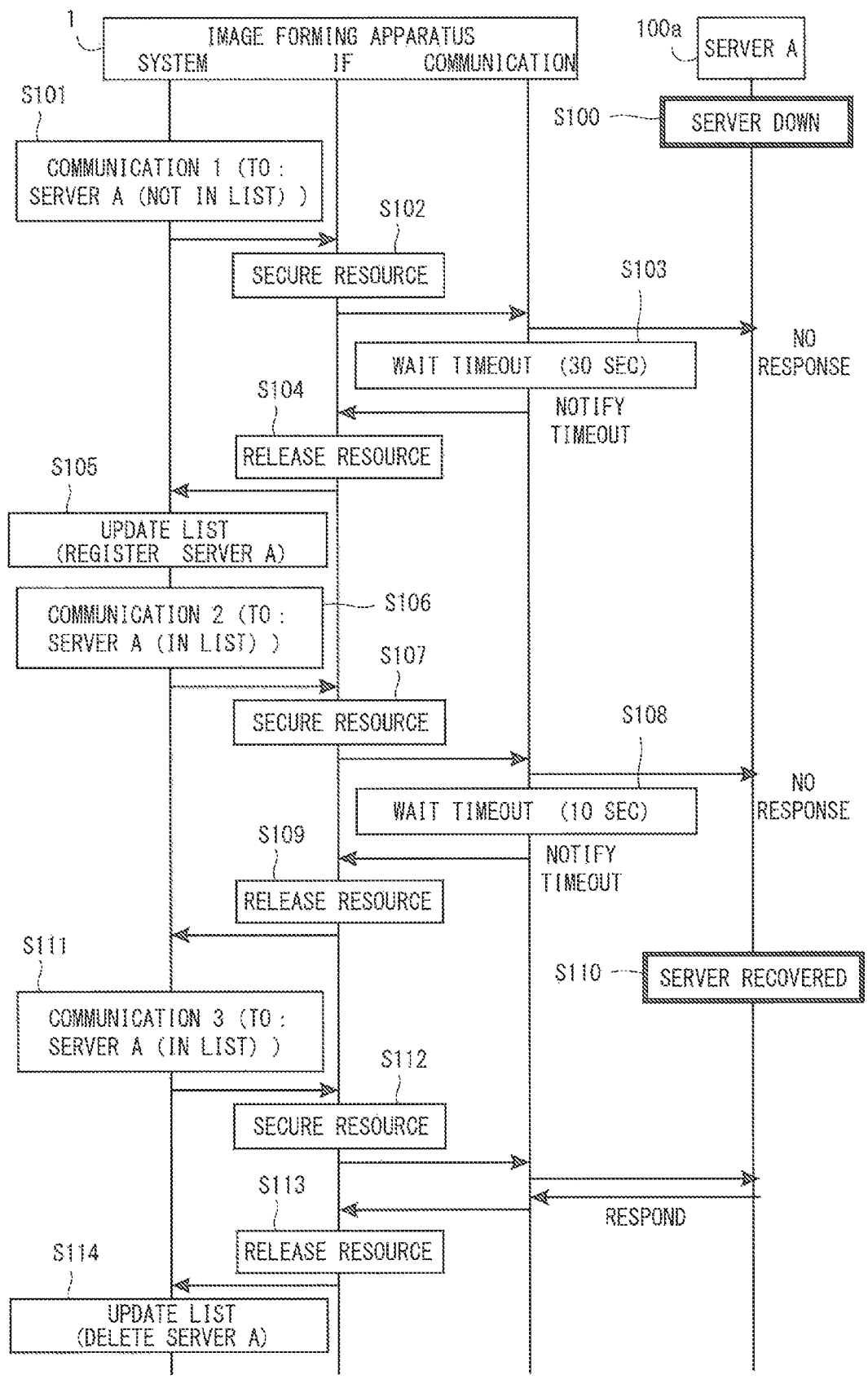
FIG. 7 is a first sequence diagram showing an operation example in a case where the image forming apparatus according to the present embodiment performs a communication process.

FIG. 7 is a first sequence diagram showing an operation example in a case where the image forming apparatus 1 according to the present embodiment performs a communication process.

As shown in FIG. 7, it is assumed that the server A (server 100a) is down (step S100). At this time, when the communication process 1 with the target as the server 100a is to be executed (step S101), the operation is performed as follows. At this time, it is assumed that the destination of the server 100a is not registered in the destination list 27b.

Since the server 100a is not registered in the destination list 27b, the timeout period is set to a predetermined period (here, it is 30 seconds). When the communication instruction is sent to the communication interface under the control of the control unit 20, communication resources are secured (step S102). Then, when a request is transmitted from the communication unit 29 to the server 100a by using the communication resource, the control unit 20 starts measuring timeout period (S103). At this time, since the server 100a is down, the response from the server 100a is not transmitted. Then, when the timing of the timeout period of 30 seconds is completed, the communication unit 29 transmits a timeout notification to the communication interface. The communication interface releases the communication resource (step S104).

When the timeout occurs in this manner, the control unit 20 updates the destination list 27b and registers the destination as the server 100a in the destination list 27b (step S105).

Thereafter, when the communication process 2 targeting the server 100a is to be executed (step S106), the operation is performed as follows. That is, since the destination list 27b has been updated in step S105, the destination of the server 100a is in the destination list 27b at this time. Then, the control unit 20 sets the timeout period to 10 seconds, which is 20 seconds shorter than the predetermined period. Under the control of the control unit 20, when the communication resource is secured (step S107) and the request is transmitted to the server 100a, the control unit 20 measures the time for 10 seconds until it determines that the timeout has occurred (step S108). When 10 seconds have elapsed, it is determined that a timeout has occurred, and communication resources are released (step S109). As described above, when communication process is performed with respect to the server 100a considered to have a high possibility of occurrence of timeout, it is determined that a timeout has occurred promptly. Therefore, the communication resources are released relatively early, and it is prevented that the communication resources are run out.

Here, when the downed server 100a is recovered (step S110), and the communication process 3 targeting the server 100a is to be executed (step S111), the operation is performed as follows. That is, since the destination of the server 100a is in the destination list 27b at this time, the control unit 20 establishes the timeout period as 10 seconds as described above and communicates with the server 100a. The communication resources are secured under the control of the control unit 20 (step S107). Since the server 100a is recovered, when a request is transmitted to the server 100a, a response is transmitted from the server 100a before the timeout period elapses. Then, the control unit 20 does not determine that a timeout has occurred, and the communication process is continued. When the communication is completed, the control unit 20 releases the communication resource (step S113), and ends the communication process.

In this way, the communication process for the destination registered in the destination list 27b is completed without occurrence of timeout. The control unit 20 updates the destination list 27b and deletes the destination of the server 100a from the destination list 27b (step S114). As a result, when communication process is performed next with the server 100a, the timeout period is determined to be normal 30 seconds.

Figure 8:
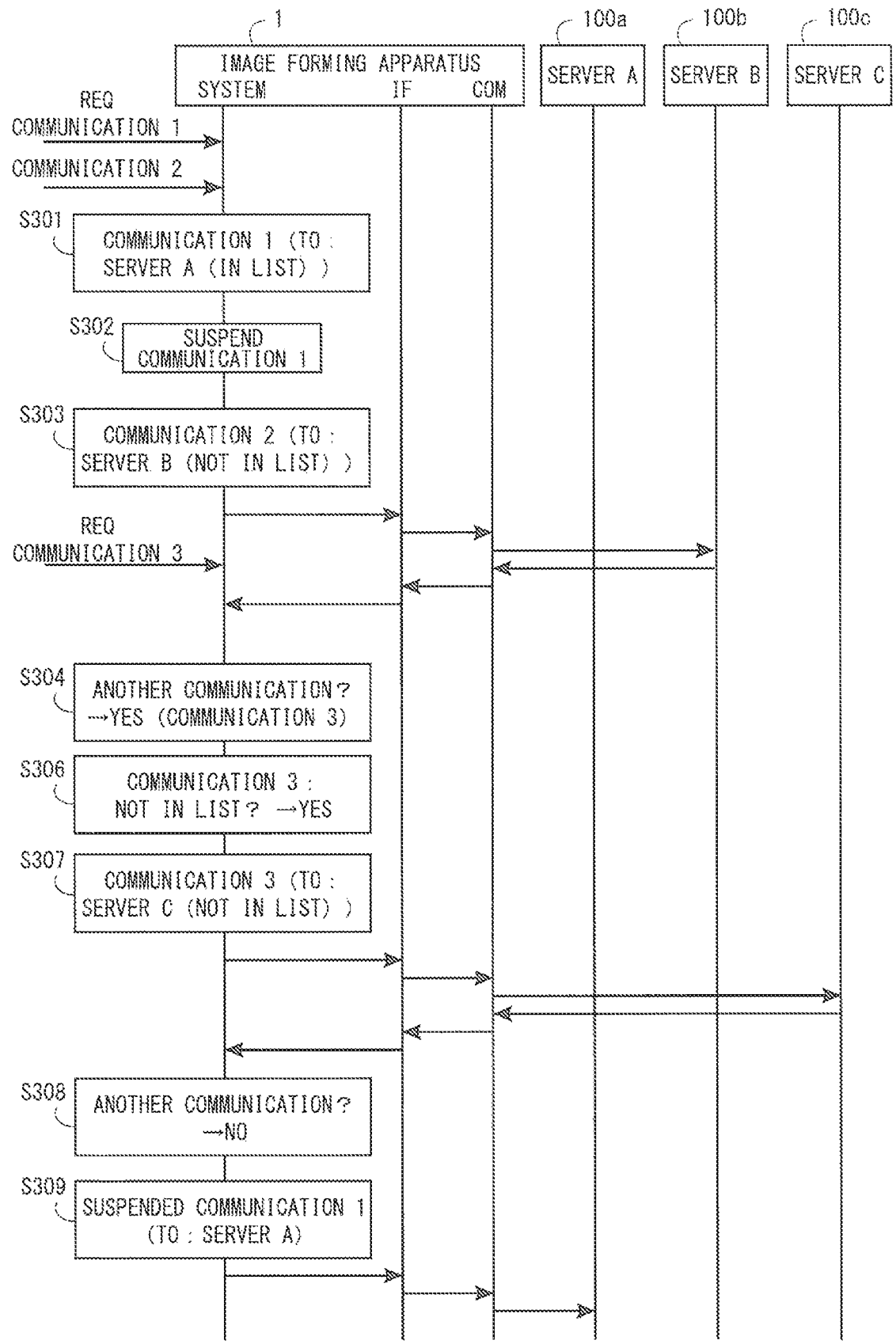
FIG. 8 is a second sequence diagram showing an operation example in a case where the image forming apparatus according to the present embodiment performs a communication process.

FIG. 8 is a second sequence diagram showing an operation example in a case where the image forming apparatus according to the present embodiment performs a communication process.

In FIG. 8, it is assumed that the destination of the server 100a is registered in the destination list 27b, and the destinations of the server 100b (server B) and the server 100c (server C) are not registered. At this time, when a request for the communication process 1 targeting the server 100a and a request for the communication process 2 for the server 100b are continuously made, the operation is performed as follows.

That is, first, the communication process 1 is to be executed (step S301). Here, the destination of the server 100a targeted by the communication process 1 is in the destination list 27b. In addition, communication process 2 to be executed next to communication process 1 also exists. Therefore, the control unit 20 temporarily stops the execution of the communication process 1 and places it in a hold state (step S302). In the communication process 1, the communication resources are not secured and the communication process 1 enters a hold state.

Next, in response to the request of the communication process 2, the communication process 2 is to be executed (step S303). The destination of the server 100b targeted by the communication process 2 is not in the destination list 27b. Therefore, a request is transmitted to the server 100b with a predetermined period as a timeout period. Here, the server 100b normally transmits a response to the request. Therefore, no timeout occurs, and the communication process 2 is completed promptly.

Here, when a new communication process 3 is requested before the communication process 2 is completed, and the communication process 3 is registered in the task queue, the following operation is performed.

That is, upon completion of the communication process 2, the control unit 20 determines whether there is a request for another communication process. Here, it is determined that there is a request for the communication process 3 (step S304). It is determined that no destination of communication process 3 is registered in the destination list 27b (step S306). Then, before performing the pending communication process 1 as a process target, the communication process 3 as a process target is performed (step S307). The communication process is started by transmitting a request to the server 100c with a predetermined period as a timeout period. Here, the server 100c normally transmits a response to the request. Therefore, no timeout occurs, and the communication process 3 is completed promptly.

Upon completion of the communication process 3, the control unit 20 determines whether there is a request for another communication process (step S308). At this time, there is no request for new communication process, so the control unit 20 is determined to have no other communication process request. Then, the control unit 20 causes the communication process 1 that has been suspended to be executed (step S309).

Effects of the Embodiment

As described above, in the present embodiment, the destination of the external apparatus in which the response timeout occurred is registered in the destination list on the side of the image forming apparatus 1. When the communication process is performed on the destination registered in the destination list, the timeout period is shortened. Therefore, even when there are requests for a plurality of communication processes in a short time for the server 100 that is down, it can be judged that a timeout has occurred relatively early and the communication resources can be released. It is possible to shorten the time during which communication resources are kept secured. Accordingly, it is possible to make it difficult for a state in which communication resources are insufficient to occur, so that communication process can be performed promptly. In an apparatus such as the image forming apparatus 1, resources such as the capacity of the RAM 25 tend to be limited, and there is a characteristic that a plurality of communication processes tend to occur at the same time. Therefore, shortage of communication resources is likely to occur. Even in the image forming apparatus 1 in which such shortage of communication resources is liable to occur, it is possible to effectively prevent shortage of communication resources.

Whether or not to shorten the timeout period is determined based on whether or not the destination of the external apparatus to be subjected to the communication process is registered in the destination list. Therefore, before the shortage of the communication resource occurs, the operation is performed so that the shortage of communication resources is less likely to occur.

The destination list is updated according to the result of the communication process. The destination where the timeout occurred is added to the destination list. The destination for which the communication process is completed without occurrence of the timeout is deleted from the destination list. Therefore, according to the state of the external apparatus, it is possible to automatically change the setting so that the timeout period becomes short for the external apparatus in which the possibility of occurrence of timeout increases. It is possible to precisely make the shortage of communication resources less likely to occur.

In the case where there is a communication process to be executed next, execution of the communication process to the external apparatus of which the destination is registered in the destination list is suspended, and other communication process is preferentially performed. Therefore, it is possible to promptly complete the communication process with a relatively high possibility of normally finishing the communication. The suspended communication process is executed when there is no other communication process, so it is not discarded.

[Description of Modifications]

In the above-described embodiment, when the timeout period is shortened, it is shortened by a predetermined shortening width, but there is no limitation to this. For example, a user may be able to set the timeout period for a case in which there is a destination in the destination list or the timeout period for a case in which there is no destination in the destination list.

Further, the control unit 20 may determine the timeout period based on the history information (response time) of past communication process performed on an external apparatus subjected to communication process. For example, a time shorter than the predetermined period by the time based on the history information may be determined as the timeout period. Specifically, for an external apparatus that takes about 10 seconds to 15 seconds for the responding at a normal time, the timeout period is set to be 20 seconds which is slightly longer than the responding time, for example. For an external apparatus that takes equal to or less than 5 seconds for the responding at the normal time, the timeout period may be set to 10 seconds which is slightly longer than that. Thus, it is possible to perform communication process by setting an appropriate timeout period according to the characteristics of each actual external apparatus.

In the above-described embodiment, each of the plurality of image forming apparatuses 1 of the image processing system 900 holds the destination list 27b, but the present invention is not limited thereto. For example, the image forming apparatus 1 that performs communication process may refer to a destination list stored in another list providing apparatus connected to the network 800. In this way, it may be determined whether or not the destination of the external apparatus to be communicated is registered.

Figure 9:
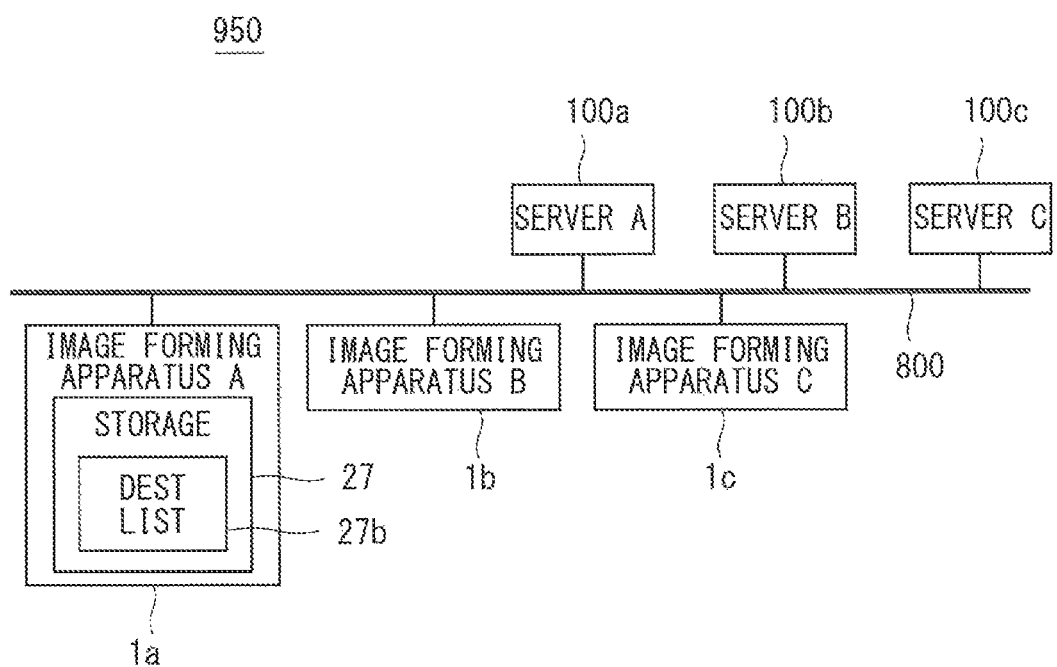
FIG. 9 is a block diagram showing a configuration of an image processing system according to a modified example of the above embodiment.
Figure 10:
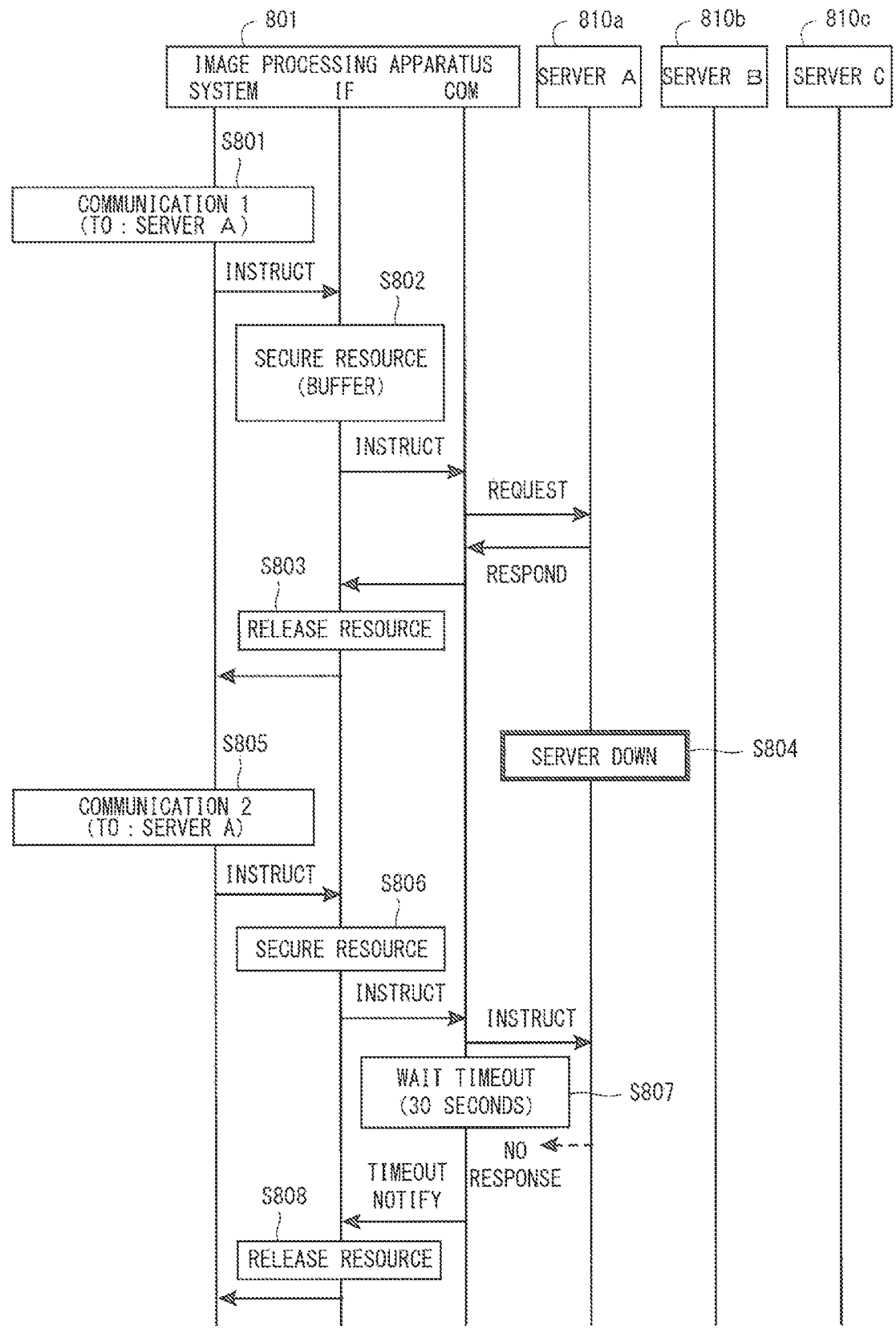
FIG. 10 shows a first diagram illustrating an example of a communication operation of a conventional image processing apparatus.
Figure 11:
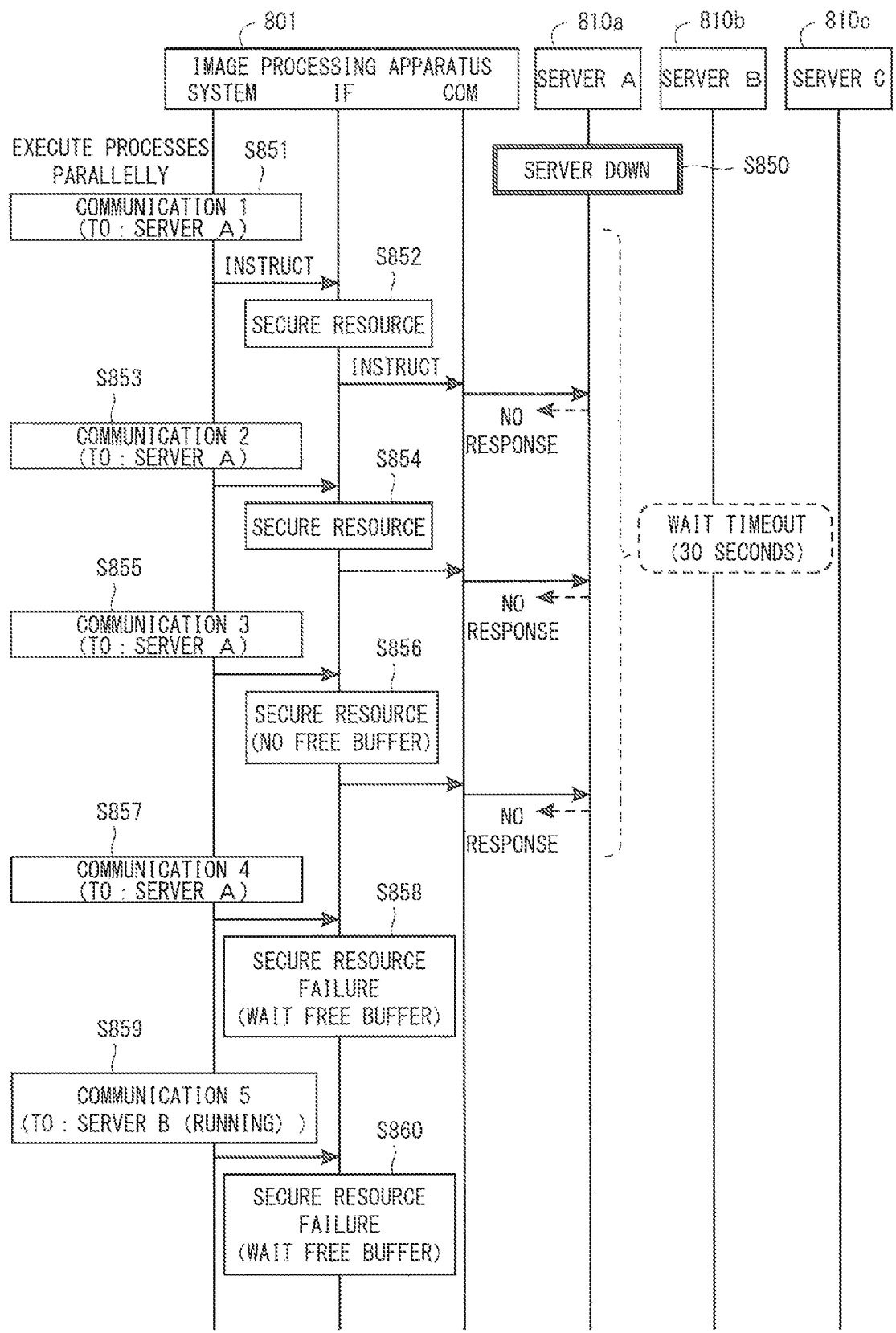
FIG. 11 shows a second diagram illustrating an example of a communication operation of a conventional image processing apparatus.

FIG. 9 is a block diagram showing a configuration of an image processing system 950 according to a modified example of the above embodiment.

As shown in FIG. 9, the image processing system 950 differs from the image processing system 900 described above in the following points. That is, the destination list 27b is stored only in the storage apparatus 27 of the image forming apparatus 1a (the image forming apparatus A; an example of the list providing apparatus) among the three image forming apparatuses 1. The destination list 27b is not stored in the other two image forming apparatuses 1b and 1c (the image forming apparatus B and the image forming apparatus C).

In the image processing system 950, the image forming apparatus 1a can confirm whether or not the destination of the external apparatus is in the destination list 27b by referring to the destination list 27b owned by the image forming apparatus 1a. On the other hand, when the image forming apparatuses 1b or 1c performs communication process, the image forming apparatus 1a functions as a list providing apparatus that provides the destination list 27b to the image forming apparatus 1b or 1c. That is, when performing the communication process, the image forming apparatuses 1b or 1c accesses the image forming apparatus 1a and refers to the destination list 27b. Further, when communication process was performed, the information is transmitted to the image forming apparatus 1a according to the result, so that the image forming apparatus 1a is caused to update the destination list 27b.

In this manner, even if the image forming apparatus 1a functioning as the list providing apparatus is provided with the destination list 27b, the information of the destination list 27b used in the image processing system 900 can be kept new as in the above case.

[Others]

The configurations and processes of the above-described embodiments may be realized in appropriate combination with each other, and a part of them may not be adopted. Further, in the above-described flow chart, the order of each processing may be appropriately reconfigured or other processing may be inserted. For example, in a case where the destination of the communication process is in the destination list, the process of giving priority to other communication processes is not necessarily performed. In addition, the process of synchronizing the destination list among the plurality of image forming apparatuses is not necessarily performed.

In the destination list, it may be possible to manage the number of occurrences of the timeout, the frequency, and the like. In that case, for example, when the communication is completed without occurrence of a timeout, the destination list may be updated by not deleting the apparatus' information and updating the number of occurrences of the timeout and so on in the destination list.

An arbitrary external apparatus may be added to or deleted from the destination list by the user's operation.

In the above-described embodiment, a so-called blacklist type destination list in which destinations in which the timeout has occurred in a predetermined time period and having a relatively high possibility of timeout occurrence are registered is used. If there is the destination of a communication process in the destination list, operations such as shortening the timeout period are performed, but the present invention is not limited to this. For example, the destination list may not be the blacklist type, but may be a list in which apparatuses corresponding to predetermined conditions are registered in the whitelist method. That is, a destination list in which the destination of the apparatus in which the timeout has not occurred within a predetermined period of time, and having a relatively low possibility of occurrence of timeout is registered may be used. If there is no destination of the communication process in the destination list, operations such as shortening the timeout period may be performed. In this case, the destination of the external apparatus may be added to the destination list, for example, when the communication process is normally completed or based on the number of times in which the communication process is normally completed. That is, for example, when it is determined that the destination of the external apparatus is not registered in the destination list, and the communication process is completed without the timeout, the destination may be registered in the destination list.

The image forming apparatus may be a monochrome/color copying machine, a printer, a facsimile machine, a multifunction peripheral (MFP) thereof, or the like. Further, the present invention is not limited to the one that forms an image by the electrophotographic method, and may form an image by a so-called inkjet method, for example. Further, the image processing apparatus may be a scanner or the like having no image forming function.

In the image processing system, a specific image forming apparatus out of a plurality of image forming apparatuses may function as a server. In this case, another image forming apparatus may be an image forming apparatus capable of executing functions such as pull printing. A plurality of image forming apparatuses including the image forming apparatus functioning as a server may be capable of executing functions such as pull printing. That is, even when one image forming apparatus performs communication process with respect to another image forming apparatus, the configuration of the above embodiment can be applied.

The processing in the above-described embodiment may be performed by software or may be performed using a hardware circuit.

The processes in the above-mentioned embodiments can be performed by software and a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to an apparatus via communication lines like the internet. The processes explained in the above flowcharts and the description are executed by a CPU in line with the program.

Although the present invention has been described and illustrated in detail, the disclosed embodiments are made for purposes of illustrated and example only and not limitation. The scope of the present invention being interpreted by terms of the appended claims.

Effect of Embodiment

According to these embodiments, it is possible to provide an image processing apparatus in which the transmission/reception buffer is less likely to run out and capable of quickly executing communication process. In addition, it is possible to provide an image forming apparatus, an image processing system, a control method of an image processing apparatus, and a control program of an image processing apparatus in which the transmission/reception buffer is less likely to run out and capable of quickly executing communication process.

What is claimed is:

1. An image processing apparatus that performs communication process with an external apparatus via a network, comprising a hardware processor that:
   determines whether or not the external apparatus that is an object of the communication process is an apparatus registered in a blacklist type list in which one or more apparatuses in which an earlier timeout has occurred are registered, by a first determination process, when performing the communication process;
   determines occurrence of the timeout in accordance with a timeout period having a duration decided based on whether or not the external apparatus is on the blacklist type list as determined by the first determination process, by a second determination process, in the communication process, the timeout period being a period of time during which the image processing apparatus attempts to connect with the external apparatus and does not receive a response from the external apparatus, and updates the blacklist type list according to the determination result of the second determination process and the determination result of the first determination process, wherein the second determination process determines a time shorter than a predetermined period as the duration of the timeout period, when the first determination process determines that the external apparatus to be subjected to the communication process is the apparatus registered in the blacklist type list, and the second determination process determines the predetermined period as the duration of the timeout period, when the first determination process determines that the external apparatus to be subjected to the communication process is not the apparatus registered in the blacklist type list.

2. The image processing apparatus according to claim 1, wherein
the hardware processor deletes the external apparatus that was the object of the communication process from the blacklist type list, when the first determination process determines that the external apparatus is registered in the blacklist type list, and the second determination process did not determine that the timeout has occurred and the communication process was completed.

3. The image processing apparatus according to claim 1, wherein
the second determination process determines a time shorter than the predetermined period as the duration of the timeout period by the time based on history information of past communication process performed with the external apparatus as the object, when the first determination process determines that the external apparatus that is the object of the communication process is the apparatus registered in the blacklist type list.

4. The image processing apparatus according to claim 1, wherein
the hardware processor preferentially executes another communication process, when the first determination process determines that the external apparatus that is the object of the communication process is the apparatus registered in the blacklist type list.

5. The image processing apparatus according to claim 1, wherein
the hardware processor temporarily suspends execution of the communication process, starts executing another communication process, and executes the temporarily suspended communication process after starting execution of the another communication process, when the first determination process determines that the external apparatus that is the object of the communication process is the apparatus registered in the blacklist type list, and there is another communication process scheduled to be executed after the communication process.

6. The image processing apparatus according to claim 1, further comprising:
a storage unit for storing the blacklist type list.

7. An image processing system comprising:
a plurality of image processing apparatuses connected to the network, according to claim 6, wherein
the hardware processor in a first image processing apparatus out of the plurality of image processing apparatuses transmits information on the update, when the hardware processor updates the blacklist type list of the first image processing apparatus, and the hardware processor in a second image processing apparatus out of the plurality of image processing apparatuses updates the blacklist type list of the second image processing apparatus based on the information related to the update transmitted from the first image processing apparatus.

8. An image forming apparatus comprising:
the image processing apparatus according to claim 1,
a hardware processor that acquires data stored in the external apparatus by performing communication process with the external apparatus, and
an image forming unit for forming an image on a sheet based on the data acquired.

9. An image processing system comprising:
the image processing apparatus according to claim 1 and a list providing apparatus, which are connected to the network, wherein
the list providing apparatus includes a storage unit that stores the blacklist type list, and
the hardware processor updates the blacklist type list by transmitting information to the list providing apparatus according to the determination result of the second determining process.

10. A method for controlling an image processing apparatus that performs communication process with an external apparatus via a network, comprising steps of:
determining whether or not the external apparatus that is an object of the communication process is an apparatus registered in a blacklist type list in which one or more apparatuses in which an earlier timeout has occurred are registered, by a first determination process, when performing the communication process;

determining occurrence of the timeout in accordance with a timeout period having a duration decided based on whether or not the external apparatus is on the blacklist type list as determined by the first determination process, by a second determination process, in the communication process, the timeout period being a period of time during which the image processing apparatus attempts to connect with the external apparatus and does not receive a response from the external apparatus, and updating the blacklist type list according to the determination result of the second determination process and the determination result of the first determination process, wherein the second determination process determines a time shorter than a predetermined period as the duration of the timeout period, when the first determination process determines that the external apparatus to be subjected to the communication process is the apparatus registered in the blacklist type list, and the second determination process determines the predetermined period as the duration of the timeout period, when the first determination process determines that the external apparatus to be subjected to the communication process is not the apparatus registered in the blacklist type list.

11. A non-transitory computer-readable recording medium storing a controlling program for an image processing apparatus that performs communication process with an external apparatus via a network, the program causing a computer to execute the steps of:

determining whether or not the external apparatus that is an object of the communication process is an apparatus registered in a blacklist type list in which one or more apparatuses in which an earlier timeout has occurred are registered, by a first determination process, when performing the communication process;

determining occurrence of the timeout in accordance with a timeout period having a duration decided based on whether or not the external apparatus is on the blacklist type list as determined by the first determination process, by a second determination process, in the communication process, the timeout period being a period of time during which the image processing apparatus attempts to connect with the external apparatus and does not receive a response from the external apparatus, and updating the blacklist type list according to the determination result of the second determination process and the determination result of the first determination process, wherein the second determination process determines a time shorter than a predetermined period as the duration of the timeout period, when the first determination process determines that the external apparatus to be subjected to the communication process is the apparatus registered in the blacklist type list, and the second determination process determines the predetermined period as the duration of the timeout period, when the first determination process determines that the external apparatus to be subjected to the communication process is not the apparatus registered in the blacklist type list.

* * * * *